United States Patent [19]
Gupta

[11] Patent Number: 5,882,529
[45] Date of Patent: Mar. 16, 1999

[54] REVERSE CENTRIFUGAL FILTER

[76] Inventor: Rajendra P. Gupta, 9 Veery Lane, Gloucester, Ontario, Canada, K1J 8X4

[21] Appl. No.: 854,396

[22] Filed: May 12, 1997

[51] Int. Cl.$^6$ .............................. B01D 21/26; B01D 33/00
[52] U.S. Cl. .......................... 210/784; 210/791; 210/808; 210/360.2; 210/380.1; 210/391; 210/416.1
[58] Field of Search ................................. 210/138, 360.2, 210/380.1, 416.1, 391, 499, 136, 780, 784, 791, 808; 209/270

[56] References Cited

U.S. PATENT DOCUMENTS

| 3,363,771 | 1/1968 | Walters | 210/304 |
| 5,376,298 | 12/1994 | Ikeda | 210/416.1 |

Primary Examiner—David A. Reifsnyder

[57] ABSTRACT

The invention relates to a reverse centrifugal filter and a method of separating solids particles suspended in a liquid. The reverse centrifugal filter of the invention contains a rotatable filter screen in a filter vessel. As the filter screen rotates, solid particles in a liquid which may accumulate on the filter screen are thrown away from it, thus keeping the filter screen alway clean for efficient operation.

12 Claims, 2 Drawing Sheets

REVERSE CENTRIFUGAL FILTER

FIELD OF THE INVENTION

The present invention relates to an apparatus for and a method of separating solid particles suspended in a liquid. In particular it is directed to a method of separating liquid from solid particles suspended therein in which a centrifugal filter screen is rotated to keep solid particles from depositing on it. The invention is also directed to a reverse centrifugal filter which contains a rotatable perforated surface provided in a filter vessel.

BACKGROUND OF THE INVENTION

The continuous removal of fine solid particles of density similar to the carrying liquid is very difficult and expensive operation. The most effective method is based on applying very high centrifugal forces to the liquid with suspended solid particles in stacked conical disc centrifuges, which forces effectively cause the denser particles to settle on the disc surface and slide outward whereas the clarified liquid flows inward under an applied hydraulic pressure. These devices are very expensive and are impractical to use for low capital budget projects. A less capital intensive approach is to use two or more filter bags with appropriate mesh size cloth and remove them in sequence to empty them of collected solids. The filter bag approach is obviously labor intensive and therefore expensive in operation. Yet another method is to filter liquid through a screen under high centrifugal forces and periodically or continuously clean the deposits from the screen by some mechanical means or forces. The net forces on liquids and solids are in the same direction and as a result the filtration surface has a tendency to be only partially open for filtration at any time. A large filtration surface area is therefore required which makes the equipment quite expensive. Also, some particles are forced through the openings in the filtration surface. In yet another method, high hydraulic forces derived from a pump drive the liquid in a circular motion in a cylindrical-conical container, called hydro-cyclone, and the resulting centrifugal forces cause the solid and liquids of different densities to separate radially. However, unless the density difference between solid particles and carrying liquid is significant and/or the particles size is large, this method does not provide reasonable level of clarification.

A method for clarification of the invention disclosed here yields an equipment that is low in the initial cost as well as in operating cost. The method uses filtration to remove fine particles from the liquid while using centrifugal forces, in the reverse direction to the hydraulic forces derived from a pump, to drive the particles away from the screen in order to continuously maintain the filtration surface clean of any solid particles. An apparatus of the invention to carry out the method described above includes a centrifugal screen enclosure provided in a vessel. The clarified liquid comes out from a first outlet and a liquid/solid sludge from a second outlet.

OBJECTS OF THE INVENTION

It is therefore an object of the invention to provide a method of and an apparatus for separating liquid from solid particles suspended therein.

It is another object of the invention to provide a method for separating liquid from solid particles suspended therein in which a centrifugal force is used to keep solid particles from depositing on the filter screen.

It is a further object of the invention to provide a reverse centrifugal filter in which a perforated filtering surface is rotated to generate the centrifugal force to keep the solid from depositing onto the filtering surface.

SUMMARY OF THE INVENTION

Briefly stated, the invention is directed to a reverse centrifugal filter for processing a liquid having suspended solid particles to produce a sludge and a clarified liquid. The filter comprises a vessel having an upper part and a conical lower part, a centrifugal screen enclosure rotatably located in the upper part of the vessel and a motor connected to the centrifugal screen enclosure for rotating the same at a speed high enough to generate a sufficient centrifugal force to the centrifugal screen enclosure to prevent the solid particles from adhering thereon. The filter further includes an inlet provided on the upper part of the vessel for introducing the liquid having suspended solid particles under pressure to outside of the centrifugal screen enclosure, a sludge outlet provided on the conical lower part of the vessel for removing the sludge from the vessel and a liquid outlet connected to the centrifugal screen enclosure for discharging the clarified liquid from inside the centrifugal screen enclosure.

According to another aspect, the invention is directed to a method of processing a liquid having suspended solid particles to produce a sludge and a clarified liquid using a rotatable perforated surface which divides a vessel into a first chamber and a second chamber. The method comprises steps of introducing the liquid having suspended solid particles into the first chamber under pressure to force the clarified liquid through the rotatable perforated surface into the second chamber thus separating the clarified liquid from the sludge, and rotating the rotatable perforated surface in the vessel to generate a sufficient centrifugal force to keep the rotatable perforated surface clear of solid deposits. The method further includes a step of removing the separated clarified liquid from the second chamber and sludge from the first chamber.

DETAILED DESCRIPTION OF THE PREFERRED EMBODIMENTS OF THE INVENTION

Figure 1:
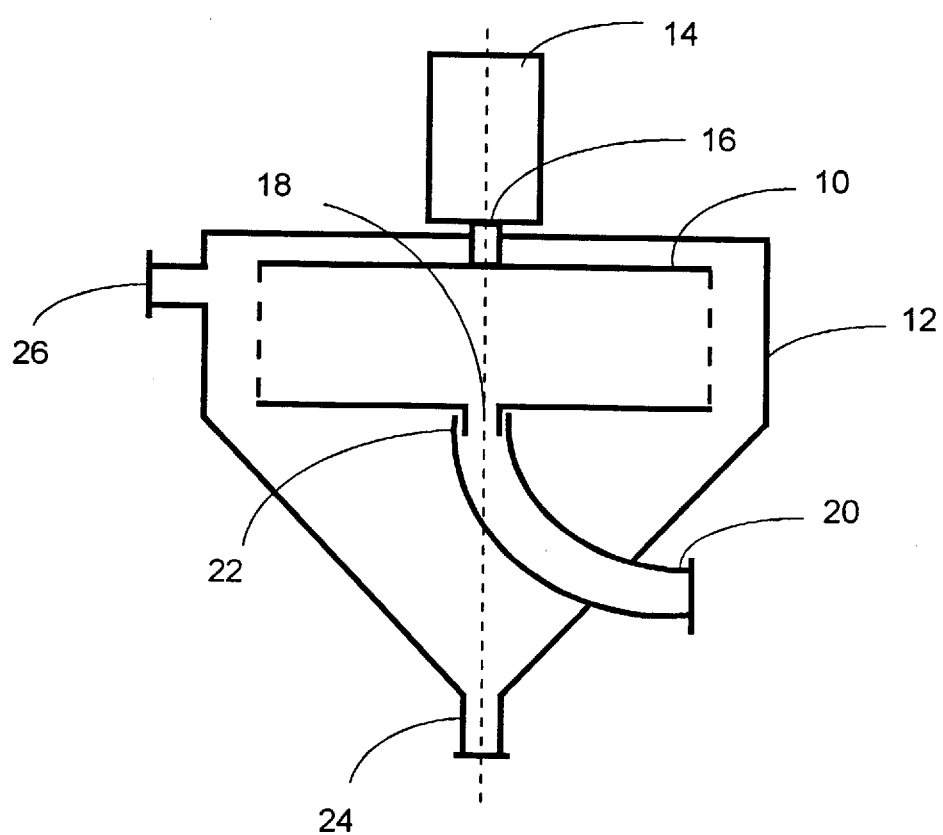
FIG. 1 is a schematic illustration of filters according to the first embodiment of the invention

FIG. 1 shows a reverse centrifugal filter according to one embodiment of the invention. Referring to FIG. 1, a cylindrical screen enclosure 10 is located inside a conical bottom vessel 12 and is rotated at high speed with a motor 14 about an axis 16. The rotating screen enclosure 10 has an axial opening 18 connected to the stationary liquid outlet 20 with a rotating seal 22. There is a sludge outlet 24 at the bottom of the vessel 12 to remove the solid-liquid sludge either continuously or periodically by opening the sludge outlet. The liquid with suspended solids is pumped into the vessel under pressure through an inlet 26 while the screen enclosure spins at high speed. When the sludge outlet 24 is closed, the liquid goes through the spinning screen and comes through the stationary liquid outlet 20. The liquid in the vicinity of the screen spins with the screen. The resulting centrifugal forces drive the solid particles away from the screen (assuming solid particles to be denser than the liquid) towards the vessel wall. These particles settle to the vessel bottom as they agglomerate with other particles. Any solids reaching the spinning screen are stopped by the screen. Any solid particles accumulating on the screen are instantaneously thrown outward and the spinning screen remains always clean. The clarified liquid is obtained at the stationary liquid outlet 20 whereas the liquid sludge with high concentration of solids is removed from the sludge outlet 24 at the bottom of the conical vessel 12. In certain circumstance, because the inlet is located at the upper part of the vessel and the sludge outlet at the lower part thereof, the sludge is introduced into the vessel under hydraulic pressure thus created and a special pump may not be needed.

Figure 2:
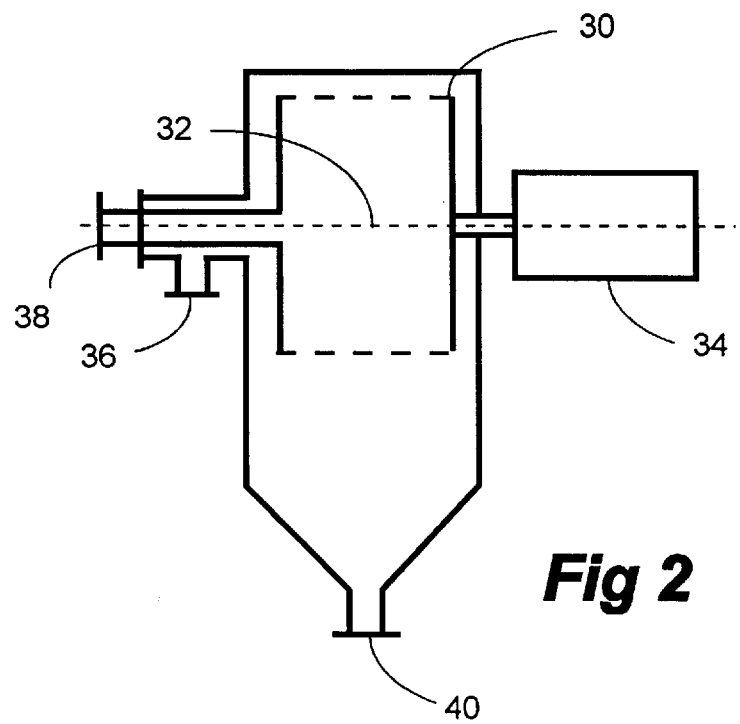
FIG. 2 is a schematic illustration of filters according to the second embodiment of the invention
Figure 3:
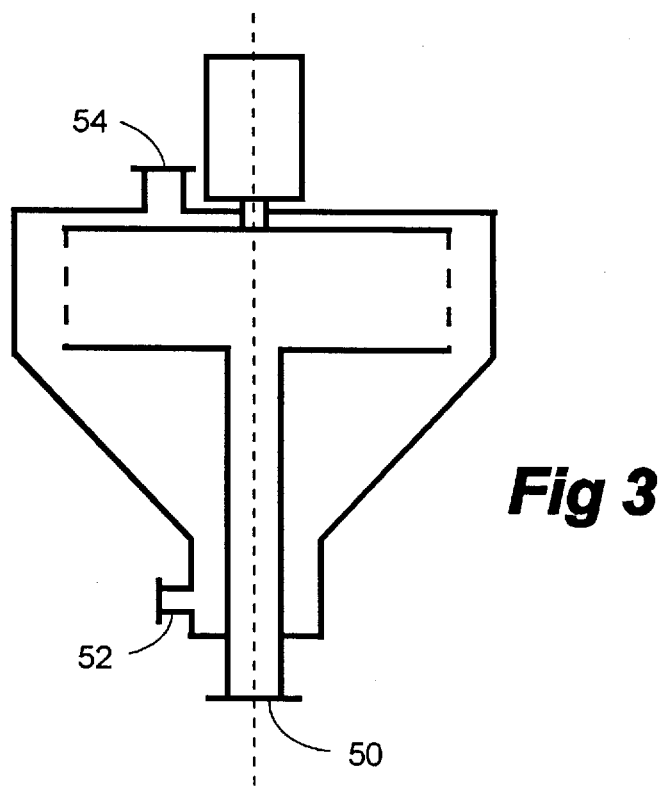
FIG. 3 is a schematic illustration of filters according to yet another embodiment of the invention

A preferred way of removing the sludge is by using a positive displacement pump that continuously or intermittently operates at a controlled speed. Alternatively, the sludge outlet could be fitted with a valve which is periodically opened for a predetermined time to remove the sludge. A solenoid valve can be operated with a timer to effectively achieve the latter. FIGS. 2 and 3 show different embodiments of the invention. In FIG. 2 a screened enclosure 30 is rotated about a horizontal axis 32 by a motor 34. An inlet 36 takes in the liquid with suspended solids and the clarified liquid is removed from a liquid outlet 38 and sludge is discharged at a sludge outlet 40. FIG. 3 is similar to the embodiment of FIG. 1 except that two outlets 50 and 52 and inlet 54 are arranged slightly differently. The operation is essentially same as that described in connection with FIG. 1.

In all these embodiments, since solid particles experience forces opposite to the liquid movement well before reaching the filtration surface, most particles never make it to the filtration surface. Those particles which do, are thrown away from the filtration surface, either immediately or, in the case of extremely fine particles, upon agglomeration. As a result, the filtration surface area required in this so called reverse filter centrifuge is much less than in the prior art filter centrifuges. The reverse filter centrifuge can thus be built at a fraction of the cost of the conventional filter or stacked disc centrifuges and is an efficient and econonmical clarifier.

What is claimed is:

1. A reverse centrifugal filter for processing a liquid having suspended solid particles to produce a sludge and a clarified liquid, comprising:

a vessel having an upper part and a conical lower part;

a centrifugal screen enclosure rotatably located in the upper part of the vessel;

an inlet provided on the upper part of the vessel for introducing the liquid having suspended solid particles to fill the vessel under pressure thereby to pass the clarified liquid through the centrifugal screen enclosure;

a sludge outlet having a closure provided on the conical lower part of the vessel for removing the sludge from the vessel;

a liquid outlet connected to the centrifugal screen enclosure for discharging the clarified liquid from inside the centrifugal screen enclosure; and a motor connected to the centrifugal screen enclosure for rotating the same at a speed that would generate a high enough centrifugal force to the centrifugal screen enclosure and the liquid-solid mixture around it to prevent the solid particles from adhering thereon.

2. The reverse centrifugal filter according to claim 1 wherein the inlet is larger in size than either or both of the liquid and sludge outlets.

3. The reverse centrifugal filter according to claim 1 wherein the centrifugal screen enclosure is rotated about either a horizontal or a vertical axis.

4. The reverse centrifugal filter according to claim 3 wherein the inlet is coaxial with the liquid outlet.

5. The reverse centrifugal filter according to claim 3 wherein the inlet is close to the axis of rotation of the centrifugal screen enclosure.

6. A method of processing a liquid having suspended solid particles to produce a sludge and a clarified liquid using a rotatable perforated surface which divides a vessel into a first chamber and a second chamber, the first chamber having a closure, comprising steps of:

introducing the liquid having suspended solid particles into the first chamber to fill the same under pressure thereby to force the clarified liquid through the rotatable perforated surface into the second chamber thus separating the clarified liquid from the sludge;

rotating the rotatable perforated surface in the vessel to generate the centrifugal force large enough to keep the rotatable perforated surface clear of solid deposits, and removing the separated clarified liquid from the second chamber and sludge from the first chamber, the latter by opening the closure.

7. The method of separating solid particles suspended in a liquid according to claim 6, wherein the solid particles and liquid are introduced into the first chamber at a upper part of the vessel and the sludge is removed from a lower part of the vessel.

8. The method of separating solid particles suspended in a liquid according to claim 7, wherein the liquid is removed from the upper part of the vessel.

9. The method of separating solid particles suspended in a liquid according to claim 7, wherein the liquid is removed from the bottom of the vessel.

10. The method of separating solid particles suspended in a liquid according to claim 6, wherein the rotatable perforated surface is rotated either horizontally or vertically to generate the centrifugal force in either horizontal or vertical plane.

11. The method of separating solid particles suspended in a liquid according to claim 10, wherein the solid particles and liquid are introduced into the first chamber and the separated liquid is removed therefrom both coaxially with the rotational axis of the rotatable perforated surface.

12. The method of separating solid particles suspended in a liquid according to claim 10, wherein the solid particles and liquid are introduced into the first chamber near the rotational axis of the rotatable perforated surface.

* * * * *